United States Patent
Zheng et al.

(10) Patent No.: US 11,554,639 B2
(45) Date of Patent: Jan. 17, 2023

(54) POWER MODULE DEVICE AND TRANSPORT REFRIGERATION SYSTEM

(71) Applicant: Carrier Corporation, Palm Beach Gardens, FL (US)

(72) Inventors: Pu Zheng, Shanghai (CN); Linhui Chen, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 378 days.

(21) Appl. No.: 16/775,813

(22) Filed: Jan. 29, 2020

(65) Prior Publication Data
US 2020/0247218 A1  Aug. 6, 2020

(30) Foreign Application Priority Data
Jan. 31, 2019  (CN) .......................... 201910099314.4

(51) Int. Cl.
*B60H 1/32* (2006.01)
*H02J 7/02* (2016.01)

(52) U.S. Cl.
CPC .............. *B60H 1/3222* (2013.01); *H02J 7/02* (2013.01); *H02J 2207/20* (2020.01)

(58) Field of Classification Search
CPC ................................ B60H 1/3222; H02J 7/02
USPC ........................................................ 62/323.1
See application file for complete search history.

(56) References Cited

U.S. PATENT DOCUMENTS

| | | | |
|---|---|---|---|
| 3,720,842 A | 3/1973 | Martin et al. | |
| 6,330,176 B1 | 12/2001 | Thrap et al. | |
| 7,750,501 B2 | 7/2010 | Huang | |
| 7,797,958 B2 | 9/2010 | Alston | |
| 7,878,013 B2 | 2/2011 | Matsuno et al. | |
| 8,295,950 B1 * | 10/2012 | Wordsworth | B60L 1/003 |
| | | | 700/297 |
| 8,378,623 B2 * | 2/2013 | Kusch | B60L 53/22 |
| | | | 320/104 |
| 8,648,574 B2 | 2/2014 | Ueno et al. | |
| 8,818,588 B2 * | 8/2014 | Ambrosio | B60L 3/12 |
| | | | 180/65.21 |
| 8,946,567 B2 | 2/2015 | Nakatsu et al. | |
| 9,071,078 B2 | 6/2015 | Rockenfeller et al. | |

(Continued)

FOREIGN PATENT DOCUMENTS

| | | |
|---|---|---|
| KR | 20120058669 A | 6/2012 |
| WO | 2010002644 A1 | 6/2009 |
| WO | 2018226389 A1 | 12/2018 |

OTHER PUBLICATIONS

European Search Report for Application No. 20153228.0; dated Jul. 10, 2020; 16 Pages.

*Primary Examiner* — Hal Kaplan
(74) *Attorney, Agent, or Firm* — Cantor Colburn LLP

(57) ABSTRACT

An electrical power module and transport refrigeration system. The electrical power module is used for an apparatus powered by a battery or/and a fuel, has a working mode and includes: a DC buck module configured to step-down a DC at least provided by the battery to a low-voltage output DC for output, or/and a DC boost module configured to step-up a low-voltage input DC provided by the apparatus powered by the fuel to a high-voltage DC for output; and a control module connected to a transport refrigeration unit, and configured to, in the working mode, control the operation of the DC buck module or/and the DC boost module.

16 Claims, 2 Drawing Sheets

(56) References Cited

U.S. PATENT DOCUMENTS

| | | |
|---|---|---|
| 9,389,007 B1 | 7/2016 | McKay |
| 9,562,715 B2 | 2/2017 | Kandasamy |
| 9,610,824 B2 | 4/2017 | Allen et al. |
| 9,969,273 B2 | 5/2018 | Rozman et al. |
| 10,046,641 B2 | 8/2018 | Penmetsa et al. |
| 10,074,981 B2 | 9/2018 | Faley et al. |
| 11,215,156 B2 * | 1/2022 | Ciaccio .............. G01R 31/3647 |
| 2007/0209378 A1 | 9/2007 | Larson |
| 2009/0018716 A1 | 1/2009 | Ambrosio |
| 2010/0045105 A1 | 2/2010 | Bovio et al. |
| 2011/0162395 A1 | 7/2011 | Chakiachvili et al. |
| 2012/0112693 A1 | 5/2012 | Kusch et al. |
| 2013/0000342 A1 | 1/2013 | Blasko et al. |
| 2014/0060097 A1 | 3/2014 | Perreault |
| 2016/0268839 A1 | 9/2016 | Mouridsen |
| 2018/0252774 A1 | 9/2018 | Ciaccio et al. |

\* cited by examiner

| Reference Sign | Name | Using battery as power | | | | Using fuel as power | | | |
|---|---|---|---|---|---|---|---|---|---|
| | | Mode 1 | Mode 2 | Mode 3 | Mode 4 | Mode 5 | Mode 6 | Mode 7 | Mode 8 |
| 1 | AC/DC conversion module | √ | × | √ | × | √ | × | √ | × |
| 2 | DC/AC conversion module | √ | √ | × | × | √ | √ | × | × |
| 3 | First IGBT module | Optional | Optional | Optional | Optional | Optional | Optional | Optional | Optional |
| 4 | DC boost module | × | × | × | × | √ | √ | √ | √ |
| 5 | Control module | √ | √ | √ | √ | √ | √ | √ | √ |
| 6 | DC buck module | √ | √ | √ | √ | × | × | × | × |
| 7 | Second IGBT module | Optional | Optional | Optional | Optional | Optional | Optional | Optional | Optional |
| R1 | External AC power source | √ | × | √ | × | √ | × | √ | × |
| R2 | Battery DC | √ | √ | √ | √ | × | × | × | × |
| R3 | External apparatus | √ | √ | √ | √ | √ | √ | √ | √ |
| R4 | External component | Optional | Optional | Optional | Optional | Optional | Optional | Optional | Optional |
| R5 | Low-voltage input DC | × | × | × | × | √ | √ | √ | √ |
| R6 | Bus | √ | √ | √ | √ | √ | √ | √ | √ |
| R7 | External device | √ | √ | √ | √ | √ | √ | √ | √ |
| R8 | Low-voltage DC | √ | √ | √ | √ | √ | √ | √ | √ |
| R9 | External component | Optional | Optional | Optional | Optional | Optional | Optional | Optional | Optional |

FIG. 2

POWER MODULE DEVICE AND TRANSPORT REFRIGERATION SYSTEM

FOREIGN PRIORITY

This application claims priority to China Patent Application No. 201910099314.4, filed Jan. 31, 2019, and all the benefits accruing therefrom under 35 U.S.C. § 119, the contents of which in its entirety are herein incorporated by reference.

FIELD OF THE INVENTION

The present invention relates to the technical field of electrical power apparatuses, and in particular, to an electrical power module device for an apparatus powered by a battery or/and a fuel (such as a transport refrigeration unit on a transport vehicle), and a transport refrigeration system including the electrical power module device.

BACKGROUND OF THE INVENTION

A transport refrigeration unit may be installed on transport vehicles such as an electric truck for refrigerating goods during transport. Such a transport refrigeration unit is typically provided with apparatus or devices such as a compressor, an electric heater, fans, valves, and a logic control board. Generally, an inverter is required to drive the compressor in the transport refrigeration unit to operate, a low-voltage DC power source is then used to provide electrical power to fan motors, valves and the like in the transport refrigeration unit, and another electrical power device is used to drive the electric heater and the like in the transport refrigeration unit. This will result in very complex harness connections between these components, devices or apparatuses and a large space occupied, and make them not easy to operate, inspect and maintain.

In addition, for transport vehicles such as an electric truck using a battery power platform, they may directly use a battery to provide electrical power for the transport refrigeration unit; however, for transport vehicles such as a diesel truck using a fuel power platform, they usually use a low-voltage DC generator (such as 12V, 24V or 48V) to provide electrical power for the transport refrigeration unit. Therefore, between the above two types of transport vehicles using different power platforms, there are also problems of harness connections of the transport refrigeration unit and incompatibility of related components.

SUMMARY OF THE INVENTION

In view of the above, the present invention provides an electrical power module device and a transport refrigeration system, thereby resolving or alleviating one or more of the problems described above as well as problems of other aspects existing in the prior art.

Firstly, according to a first aspect of the present invention, an electrical power module device is provided, which is used for an apparatus powered by a battery or/and a fuel, has a working mode and comprises: a DC buck module configured to step-down a DC at least provided by the battery to a low-voltage output DC for output, or/and a DC boost module configured to step-up a low-voltage input DC provided by the apparatus powered by the fuel to a high-voltage DC for output; and a control module connected to the apparatus and configured to, in the working mode, control the operation of the DC buck module or/and the DC boost module.

In the electrical power module device according to the present invention, optionally, the electrical power module device further comprises: an AC port configured to be connected to an external AC power source to access electrical power; or/and a DC port configured to be connected to the battery to access electrical power; or/and a low-voltage input DC port configured to access a low-voltage DC from the apparatus and having a voltage lower than the DC provided by the battery to provide electrical power to the control module or/and an external device.

In the electrical power module device according to the present invention, optionally, the external device comprises a logic control board, a fan motor, and a valve of the apparatus.

In the electrical power module device according to the present invention, optionally, the electrical power module device further has: a charging mode in which the control module controls the AC accessed from the external AC power source via the AC port to charge the battery connected via the DC port; and/or a standby mode in which the control module controls the low-voltage DC to be accessed via the low-voltage input DC port and then output to the external device.

In the electrical power module device according to the present invention, optionally, the control module is configured such that: in the working mode, when one of the AC port and the DC port is used to access electrical power, a path for accessing power from the one port is in an on-state, and a path for accessing electrical power from the other port is in an off-state; and/or in the working mode, when the DC buck module fails to output the low-voltage output DC, the electrical power module device is switched to the standby mode.

In the electrical power module device according to the present invention, optionally, the electrical power module device further comprises: an AC/DC conversion module connected to the control module, the AC port and the DC buck module, and configured to, in the working mode, convert the AC accessed from the external AC power source via the AC port to a DC and then provide the DC to the DC buck module; or a DC/AC conversion module connected to the control module and the DC port, having a connection port for connecting with an external apparatus, and configured to, in the working mode, convert the DC accessed via the DC port to an AC and then provide the AC to the external apparatus via the connection port.

In the electrical power module device according to the present invention, optionally, the electrical power module device further comprises: an AC/DC conversion module connected to the control module, the AC port and the DC buck module, and configured to, in the working mode, convert the AC accessed from the external AC power source via the AC port to a DC and then provide the DC to the DC buck module; and a DC/AC conversion module connected to the control module and the AC/DC conversion module, having a connection port for connecting with an external apparatus, and configured to, in the working mode, convert the DC converted by the AC/DC conversion module to an AC and then provide the AC to the external apparatus via the connection port.

In the electrical power module device according to the present invention, optionally, the apparatus is a transport refrigeration unit on a transport vehicle, the external AC power source comprises a commercial power grid, and the external apparatus comprises a compressor and a compressor shell heater of the transport refrigeration unit.

In the electrical power module device according to the present invention, optionally, the electrical power module device further comprises: at least one output port; and at least one Insulated Gate Bipolar Transistor (IGBT) module connected to the DC port, the AC/DC conversion module or the DC boost module, and connected to the output port and configured to control a path on/off state or/and a power magnitude externally delivered to an external component via the output port by the DC provided via the DC port, the AC/DC conversion module or the DC boost module.

In the electrical power module device according to the present invention, optionally, the external component comprises an electric heater for a transport refrigeration unit on a transport vehicle.

In the electrical power module device according to the present invention, optionally, the low-voltage output DC is configured to provide electrical power for the control module or/and an external device, and the external device comprises a logic control board, a fan motor and a valve of a transport refrigeration unit on a transport vehicle.

In the electrical power module device according to the present invention, optionally, the control module and the transport refrigeration unit is communicated through a bus communication connection.

In the electrical power module device according to the present invention, optionally, the voltage values of the low-voltage output DC and the low-voltage input DC are the same or different; and/or, a voltage range of the battery DC and the high-voltage DC is 200V~850V, a voltage value of the low-voltage output DC is 12V, 24V or 48V, and a voltage value of the low-voltage input DC is 12V, 24V or 48V.

In the electrical power module device according to the present invention, optionally, the transport vehicle comprises a vehicle, an aircraft, and a watercraft, and the vehicle comprises a pure electric vehicle, a hybrid powered vehicle, a fuel powered vehicle, and a rail vehicle.

Secondly, according to a second aspect of the present invention, a transport refrigeration system is provided, which is disposed on a transport vehicle and comprises: a transport refrigeration unit configured to provide a refrigeration environment; a power module configured to provide power for the transport vehicle by means of a battery or/and a fuel; and the electrical power module device according to any one of the above described, which is connected to the power module and is configured to provide electrical power for the transport refrigeration unit.

In the transport refrigeration system according to the present invention, optionally, the electrical power module device is disposed in the transport refrigeration unit.

From the following detailed description in combination with the accompanying drawings, the principles, features, characteristics, advantages and the like of the various technical solutions according to the present invention will be clearly understood. For example, as compared with related art, by adopting the technical solutions of the present invention, various functional modules can be integrated in the electrical power module device or some of modules can be removed according to specific application requirements, so that a flexible modular design can be realized, an arrangement space can be effectively saved, and an original complex harness wiring layout can be simplified, which helps to reduce cost and can bring great convenience to the operation, maintenance and the like of the transport refrigeration unit. In addition, the electrical power module device of the present invention can be compatibly applied to transport refrigeration units on different transport vehicles using batteries, fuels and the like as power, and therefore has a very wide range of applications.

BRIEF DESCRIPTION OF THE DRAWINGS

The technical solutions of the present invention will be further described in detail below with reference to the accompanying drawings and embodiments. However, these drawings are designed merely for the purpose of explanation, are only intended to conceptually illustrate the structural configuration herein, and are not required to be drawn to scale.

FIG. 2 is a list of some embodiments of the electrical power module device according to the present invention in which different constituent arrangement modes are used.

DETAILED DESCRIPTION OF THE EMBODIMENT(S) OF THE INVENTION

Figure 1:
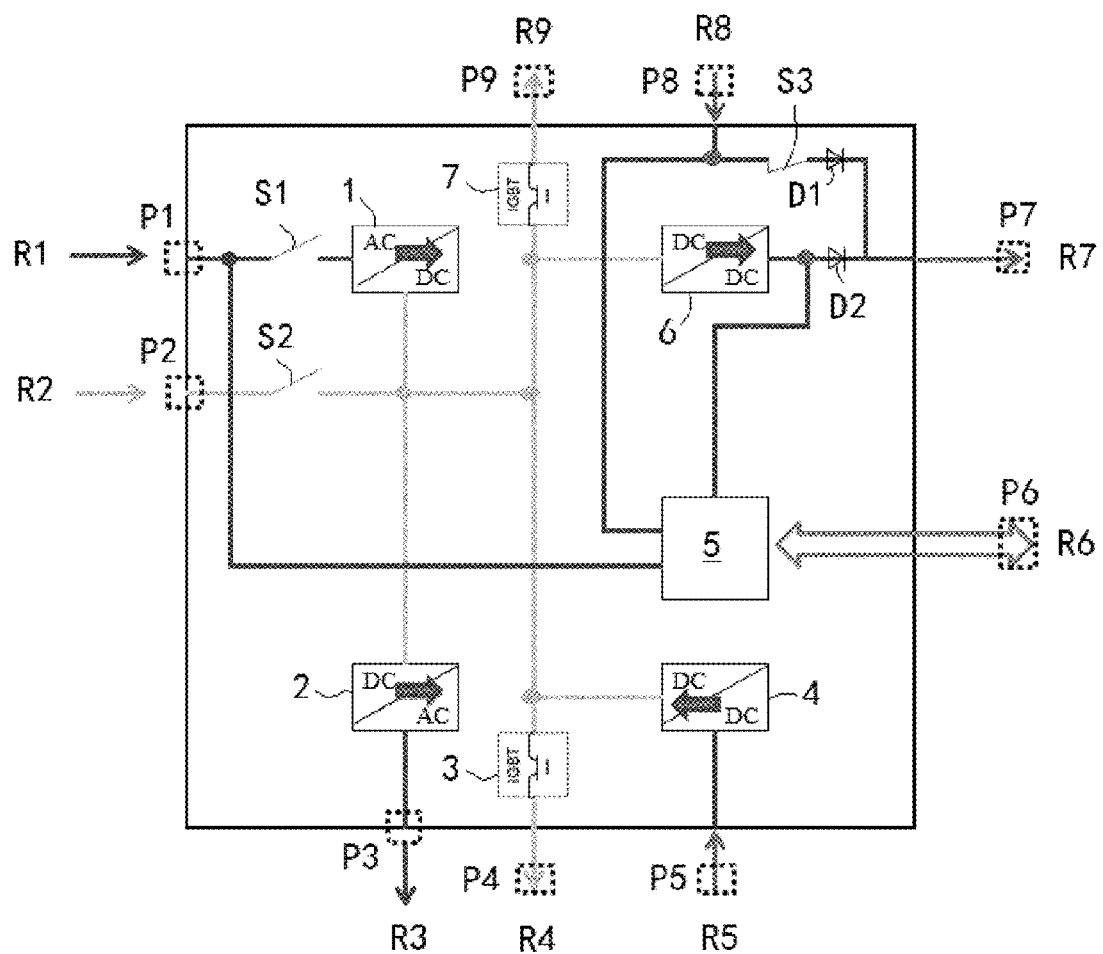
FIG. 1 is a schematic view of the constituent arrangement of an embodiment of an electrical power module device according to the present invention.

First, it is noted that the components, characteristics, advantages and the like of the electrical power module and the transport refrigeration system according to the present invention will be described below by way of example. However, all the description is not intended to limit the present invention in any way.

Herein, the technical terms "first" and "second" are only used for the purpose of distinguishing the expressions, and are not intended to indicate their order and relative importance. The technical term "connect" means that one component is directly connected to another component and/or indirectly connected to another component, and a connection via the "port" may be performed either by using an intermediate connector or the like, or by directly using a cable or the like. The technical terms "high voltage" and "low voltage" are relative concepts, and they can be fully understood and implemented by those skilled in the art in the context of the present disclosure.

In addition, for any single technical feature described or implied in the embodiments mentioned herein, or any single technical feature shown or implied in individual drawings, the present invention still allows for any combination or deletion of these technical features (or equivalents thereof) without any technical obstacle. Therefore, it should be considered that more embodiments according to the present invention are within the scope of the present invention.

Reference is made to FIG. 1, in which an embodiment of an electrical power module device according to the present invention is exemplarily shown, and the constituent arrangement of the embodiment is shown only in a schematic manner. The electrical power module device can be used to provide power configuration for many types of apparatuses (such as a transport refrigeration unit installed on a transport vehicle, which will be exemplarily described below as an example), and the electrical power module device may be compatibly used in battery powered, fuel (such as gasoline, diesel, hydrogen, etc.) powered or hybrid powered transport vehicles which include, but are not limited to, a vehicle (such as a pure electric vehicle, a hybrid powered vehicle, a fuel powered vehicle, and a rail vehicle), an aircraft, and a watercraft.

As shown in FIG. 1, in this given embodiment, the electrical power module device may include an AC/DC conversion module 1, a DC/AC conversion module 2, a first Insulated Gate Bipolar Transistor (IGBT) module 3, a DC boost module 4, a control module 5, a DC buck module 6, and a second IGBT module 7, and may be provided with a plurality of input ports or output ports denoted by reference numerals P1-P9 respectively. These functional modules and various ports will be described in detail below.

First, as for the AC/DC conversion module 1, it may be connected to an AC port P1, the control module 5 and the DC/AC conversion module 2 so as to connect an external AC power source R1 (such as a commercial power grid, etc.) to the electrical power module device via the AC port P1, then convert the AC to DC, and then provide the DC after the conversion to the DC/AC conversion module 2 so that the DC/AC conversion module 2 performs a conversion from DC to AC and then provide the AC after the conversion to an external apparatus R3 via a connection port P3. Such an external apparatus R3 includes, but is not limited to, a compressor, a compressor shell heater and the like of a transport refrigeration unit.

As shown in FIG. 1, the AC/DC conversion module 1 and the DC buck module 6 may also be connected, so that the DC buck module 6 may be used to further utilize the DC obtained after the conversion performed by the AC/DC conversion module 1.

As for the DC buck module 6, it is configured to step down the input DC to a low-voltage output DC for output. The low-voltage output. DC may be, for example, 12V, 24V, or 48V, or have other suitable voltage value to meet the requirements of various possible specific applications. The above input DC is usually a high-voltage DC with a voltage range of 200V~850V. It may be provided by a battery on a transport vehicle, or it may be obtained by connecting the external AC power source R1 to the electrical power module device and then performing an AC-DC conversion using the AC/DC conversion module 1.

The low-voltage output DC obtained after the step-down conversion of the DC buck module 6 may be output to an external device R7 via a port P7 to meet the requirements of various possible applications. For example, the low-voltage output DC may be provided to a logic control board(s), a fan motor(s), a valve(s) and the like of the transport refrigeration unit. In specific applications, components such as a diode D2 may also be optionally disposed on a link from the DC buck module 6 to the port P7 to prevent the current from flowing in a reverse direction, thereby improving the safety of the entire system.

In the electrical power module device shown in FIG. 1, a DC boost module 4 may be further provided. The DC boost module 4 may be configured to, in the case of a fuel-powered transport vehicle, step up a low-voltage input DC (such as 12V, 24V or 48V, etc., denoted by a symbol "R5" in FIG. 1) accessed via a port P5 by some devices or apparatuses (such as a low-voltage DC generator, etc.) disposed in the transport vehicle to a high-voltage DC, which may be processed and then provided to other functional modules in the electrical power module device or may be output to the outside; for example, the high-voltage DC may be input to the DC/AC conversion module 2 for conversion and then output to the outside, or the high-voltage DC may be input to the first IGBT module 3 and/or the second IGBT module 7 for processing and then output to the outside, which will be explained later in greater detail.

The control module 5 is a control portion in the electrical power module device, and may be connected with other modules in the electrical power module device so as to correspondingly control the operation of these modules. In order to simplify the figure, not all of these complex connection control circuits are drawn in FIG. 1. In addition, a bus communication such as Controller Area Net-work Bus (CANBUS) may also be used to implement the communication connection between the control module 5 and the transport refrigeration unit. As a more specific exemplary description, the control module 5 may be connected to the logic control board in the transport refrigeration unit through a bus R6 via a port P6 to implement the above-mentioned communication connection.

In practical applications, various ways may be used to provide electrical power to the control module 5 itself. By way of example, the control module 5 may be supplied with electrical power using a low-voltage output DC output from the DC buck module 6 after the step-down conversion.

For another example, the control module 5 may be supplied with electrical power from a low-voltage DC accessed from an external apparatus R8 via a low-voltage input DC port P8. The external apparatus R8 may usually be a low-voltage battery on a transport vehicle, and it may provide electrical power to the control module 5 and the like, so that the electrical power is usually used only as a control power and not for supplying a large current. For example, when the electrical power module is in a standby mode, the DC buck module 6 has no input at this point, and therefore does not provide a low-voltage output DC. The control module 5 may control to communicate the low-voltage input DC port P8 with the port P7; that is, the low-voltage DC provided by the external apparatus R8 is used to supply electrical power to a controller and the like in the transport refrigeration unit, so that the machine set can operate at any time. In addition, components such as a diode D1 and a switch S3 may be optionally disposed on a link from the low-voltage input DC port P8 to the port P7 to prevent the following situation: when the electrical power module is in the working mode, the electrical power output from the DC buck module 6 will not be input to the external apparatus R8 such as the low-voltage battery via the low-voltage input DC port P8. As such, a load is prevented from being added to the charging of the low-voltage battery. In addition, if the DC buck module 6 fails to output the low-voltage output DC due to a failure or the like, the electrical power module may end the current working mode at this point, and then switch to the standby mode, in which the low-voltage output DC input from the low-voltage input DC port P8 discussed above is provided to the transport refrigeration unit via the port P7.

As another example, a battery may be separately configured for the electrical power module device or the control module 5, so that electrical power may be provided to the control module 5.

The electrical power module device may be provided with one or more operating modes. For example, in some operating modes, the control module 5 may perform various controls on the operation of one or more modules in the electrical power module device in order to meet actual application requirements.

For example, when in an operating mode, the control module 5 may control the operations of the DC boost module 4 and the DC buck module 6 to implement their respective functions.

As further another example, an AC port P1 and a DC port P2 may be configured in the electrical power module device at the same time, wherein the AC port P1 is configured to access the AC of the external AC power source R1, and the DC port P2 is configured to access the battery DC denoted by the symbol "R2" in FIG. 1. The battery DC may be input to the DC/AC conversion module 2 to be converted into AC which is then provided to the external apparatus R3. In a case that the above-mentioned AC port P1 and DC port P2 are disposed at the same time, in order to ensure safety, when one of the two ports is used to access electrical power, the control module 5 performs a control such that a path for accessing power from the one port is in an on-state, and a path for accessing electrical power from the other port is in an off-state. As an example, this can be implemented by controlling on and off states of the switches S1 and S2 for example shown in FIG. 1 by the control module 5.

In addition, in an optional situation, the electrical power module device may be set to have a charging mode. In the charging mode, the control module 5 may be configured to connect the AC to the electrical power module device from the external AC power source R1 via the AC port P1, and then charge, via the DC port P2, the battery connected to it. In this way, the battery energy of the transport vehicle can be very conveniently supplemented.

As shown in FIG. 1, in an optional situation, one or more IGBT modules and corresponding output ports may be disposed in the electrical power module device. Such IGBT modules may be connected to any port, interface and the like that can provide a high-voltage DC (such as an output end of the AC/DC conversion module 1, an output end of the DC boost module 4, the DC port P2, etc., that have already been discussed above) so as to achieve a stepless adjustment of the output power (that is, it can be adjusted from 0 (OFF) to a preset maximum power, and vice versa), and/or achieve on or off of the outward delivering path, which will be very convenient for various possible specific applications.

As an exemplary description, in the embodiment shown in FIG. 1, the electrical power module device is provided with the first IGBT module 3 and the second IGBT module 7 which can provide electrical power to external components R4 and R9 via the output ports P4 and P9, respectively. Such external components R4, R9 may for example include, but are not limited to, an electric heater and the like of the transport refrigeration unit.

In connection with the embodiment shown in FIG. 1, the electrical power module device and the structural components, functions, connections of the constituent modules, input ports, output ports and the like thereof have been described in detail above. In practical applications, all these components may be integrated and assembled together to form an electrical power module device having a compact structure, various functions and reliable performance. The electrical power module device can not only support a transport refrigeration unit on a battery-powered transport vehicle, but also support a transport refrigeration unit on a fuel-powered or hybrid powered transport vehicle, which can significantly reduce the use of cables on the site, save a lot of harness materials, greatly reduce the corresponding wiring operations, and improve the convenience and practicability; at the same time, a potential safety risk in existing apparatus caused by the existence of a lot of harnesses, connecting devices and the like is also reduced.

However, it should be noted that in specific applications, the present invention completely allows for various possible combinations of these component modules, input ports, output ports and the like in the electrical power module device so as to better meet actual application requirements.

For example, in FIG. 2, eight configuration modes that can be selected by the electrical power module device in different situations of using a battery and a fuel as power respectively are illustrated in FIG. 2 by way of example only. In FIG. 2, the symbol "√" is used to indicate that it has been selected for configuration in the electrical power module device, the symbol "X" is used to indicate that it has not been selected for configuration in the electrical power module device, and the text "optional" indicates that it may be configured in the electrical power module device, and may also be removed from the electrical power module device. Since the technical contents of these constituent modules, input ports, output ports and the like in the electrical power module device have been described in detail in the foregoing, those skilled in the art can fully understand these selectable configuration modes of the electrical power module device listed in the list of FIG. 2 by referring to the specific descriptions in the corresponding foregoing parts, and a description will not be repeated herein.

In addition, it should be understood that according to the spirit of the present invention, the electrical power module device is allowed to have more possible configuration modes, and is not only limited to the eight configuration modes shown in FIG. 2. That is to say, for the functional modules, components, input ports, output ports and the like in the electrical power module device, any possible combination configuration of them may be implemented, and such combination configuration can be determined and adjusted according to specific application requirements. Since a modular design concept is adopted in the present invention, a required combination configuration of the functional modules, components, input ports, output ports and the like can be realized very conveniently and easily, thereby for example reducing costs, reducing product volume, save harness consumables, simplifying engineering wiring operations and achieving many other good technical effects.

As another aspect that is obviously superior to the related art, the present invention also provides a transport refrigeration system, which may include a transport refrigeration unit, a power module, and the electrical power module device designed and provided according to the present invention, so as to present the significant technical advantages of the solution of the present invention as described above.

Specifically, the transport refrigeration system may be disposed on, for example, a transport vehicle such as a vehicle (e.g., a pure electric vehicle, a hybrid powered vehicle, a fuel powered vehicle, and a rail vehicle), an aircraft, and a watercraft, wherein a refrigeration environment is provided by the transport refrigeration unit therein so as to refrigerate and protect the goods and the like stored in the transport vehicle during transport and the like.

For the power module, it can use batteries, fuels (such as gasoline, diesel, hydrogen, etc.) to provide power for the transport vehicle. The electrical power module device designed and provided according to the present invention can be connected to the power module so that electrical power can be supplied to the transport refrigeration unit in the transport refrigeration system. Regarding the specific components, functional configuration and arrangement position of the electrical power module device that can be used for the transport refrigeration unit, they may be flexibly set and adjusted according to specific application requirements.

For example, in practical applications, the specific arrangement position of the electrical power module device may be flexibly set according to the requirements; for example, the electrical power module device may be installed in the transport refrigeration unit or at any other suitable position on the transport vehicle.

The electrical power module device and the transport refrigeration system according to the present invention are explained in detail above by way of example only. These examples are only used to explain the principle of the present invention and embodiments thereof, and are not intended to limit the present invention. Those skilled in the art may also make various modifications and improvements without departing from the spirit and scope of the present invention. Therefore, all equivalent technical solutions shall fall within the scope of the present invention and be defined by the claims of the present invention.

What is claimed is:

1. An electrical power module device, characterized in that the electrical power module device is used for an apparatus powered by a battery and a fuel, has a working mode and comprises:
   a DC port configured to be connected to the battery to access electrical power;
   a low-voltage input DC port configured to access a low-voltage DC from the apparatus and having a voltage lower than the DC provided by the battery to provide electrical power to a control module and an external device;
   a DC buck module configured to step-down an input DC voltage to a low-voltage output DC for output;
   a DC boost module configured to step-up a low-voltage input DC provided by the apparatus powered by the battery and the fuel to a high-voltage DC for output; and
   the control module connected to the apparatus and configured to, in the working mode, control the operation of the DC buck module and the DC boost module.

2. The electrical power module device according to claim 1, further comprising:
   an AC port configured to be connected to an external AC power source to access electrical power.

3. The electrical power module device according to claim 2, wherein the external device comprises a logic control board, a fan motor, and a valve of the apparatus.

4. The electrical power module device according to claim 2, wherein the electrical power module device further has:
   a charging mode in which the control module controls the AC accessed from the external AC power source via the AC port to charge the battery connected via the DC port; and
   a standby mode in which the control module controls the low-voltage DC to be accessed via the low-voltage input DC port and then output to the external device.

5. The electrical power module device according to claim 4, wherein the control module is configured such that:
   in the working mode, when one of the AC port and the DC port is used to access electrical power, a path for accessing power from the one port is in an on-state, and a path for accessing electrical power from the other port is in an off-state; and/or
   in the working mode, when the DC buck module fails to output the low-voltage output DC, the electrical power module device is switched to the standby mode.

6. The electrical power module device according to claim 2, further comprising:
   an AC/DC conversion module connected to the control module, the AC port and the DC buck module, and configured to, in the working mode, convert the AC accessed from the external AC power source via the AC port to a DC and then provide the DC to the DC buck module; and
   a DC/AC conversion module connected to the control module and the DC port, having a connection port for connecting with an external apparatus, and configured to, in the working mode, convert the DC accessed via the DC port to an AC and then provide the AC to the external apparatus via the connection port.

7. The electrical power module device according to claim 6, wherein the apparatus is a transport refrigeration unit on a transport vehicle, the external AC power source comprises a commercial power grid, and the external apparatus comprises a compressor and a compressor shell heater of the transport refrigeration unit.

8. The electrical power module device according to claim 7, wherein the control module and the transport refrigeration unit are communicated through a bus communication connection.

9. The electrical power module device according to claim 7, wherein the transport vehicle comprises a vehicle, an aircraft, and a watercraft, and the vehicle comprises a pure electric vehicle, a hybrid powered vehicle, a fuel powered vehicle, or a rail vehicle.

10. The electrical power module device according to claim 6, further comprising:
    at least one output port; and
    at least one Insulated Gate Bipolar Transistor (IGBT) module connected to the DC port, the AC/DC conversion module or the DC boost module, and connected to the output port and configured to control a path on/off state or/and a power magnitude externally delivered to an external component via the output port by the DC provided via the DC port, the AC/DC conversion module or the DC boost module.

11. The electrical power module device according to claim 10, wherein the external component comprises an electric heater for a transport refrigeration unit on a transport vehicle.

12. The electrical power module device according to claim 2, further comprising:
    an AC/DC conversion module connected to the control module, the AC port and the DC buck module, and configured to, in the working mode, convert the AC accessed from the external AC power source via the AC port to a DC and then provide the DC to the DC buck module; and
    a DC/AC conversion module connected to the control module and the AC/DC conversion module, the DC/AC conversion module having a connection port for connecting with an external apparatus, and configured to, in the working mode, convert the DC converted by the AC/DC conversion module to an AC and then provide the AC to the external apparatus via the connection port.

13. The electrical power module device according to claim 1, wherein the low-voltage output DC is configured to provide electrical power for the control module and the external device.

14. The electrical power module device according to claim 1, wherein a voltage range of the battery DC and the high-voltage DC from the DC boost module is 200V~850V, a voltage value of the low-voltage output DC is 12V, 24V or 48V, and a voltage value of the low-voltage input DC is 12V, 24V or 48V.

15. A transport refrigeration system disposed on a transport vehicle, comprising:
    a transport refrigeration unit configured to provide a refrigeration environment;
    a power module configured to provide power for the transport vehicle by means of a battery and a fuel; and
    an electrical power module device which is connected to the power module and is configured to provide electrical power for the transport refrigeration unit, the electrical power module device including:

a DC buck module configured to step-down an input DC voltage to a low-voltage output DC for output;

a DC boost module configured to step-up a low-voltage input DC provided by an apparatus powered by the fuel to a high-voltage DC for output; and a control module connected to the apparatus and configured to control the operation of the DC buck module and the DC boost module.

16. The transport refrigeration system according to claim 15, wherein the electrical power module device is disposed in the transport refrigeration unit.

\* \* \* \* \*